United States Patent [19]

Bothner

[11] Patent Number: 6,110,226
[45] Date of Patent: Aug. 29, 2000

[54] JAVA DEVELOPMENT ENVIRONMENT USING OPTIMIZING AHEAD-OF-TIME COMPILER

[75] Inventor: Per Bothner, Cupertino, Calif.

[73] Assignee: Cygnus Solutions, Sunnyvale, Calif.

[21] Appl. No.: 09/025,842

[22] Filed: Feb. 19, 1998

[51] Int. Cl.[7] .................................................. G06F 9/45
[52] U.S. Cl. ...................................... 717/7; 717/5; 717/9
[58] Field of Search .................................... 395/702, 705, 395/707, 709, 710; 709/305; 717/7, 5, 9, 2, 10; 703/332

[56] References Cited

U.S. PATENT DOCUMENTS

| | | | |
|---|---|---|---|
| 5,375,242 | 12/1994 | Kumar et al. | 395/707 |
| 5,551,039 | 8/1996 | Weinberg et al. | 395/706 |
| 5,581,696 | 12/1996 | Kolawa et al. | 714/38 |
| 5,590,331 | 12/1996 | Lewis et al. | 395/708 |
| 5,664,172 | 9/1997 | Antoshenkov | 707/4 |
| 5,768,593 | 6/1998 | Walters et al. | 395/705 |
| 5,812,854 | 9/1998 | Steinmetz et al. | 395/709 |
| 5,836,014 | 11/1998 | Faiman, Jr. | 395/707 |
| 5,946,487 | 8/1999 | Dangelo | 395/705 |

OTHER PUBLICATIONS

Dean, J., et al., "Vortex: an optimizing compiler for object-oriented languages", Proc. of the Eleventh Annual Conference on Object–Oriented Programming Systems, Languages, and Applications, vol. 31, No. 10, pp. 83–100, section 3, p. 85, (Oct. 1996).

Fleischmann, J., et al., "A hardware/software prototyping environment for dynamically reconfigurable embedded systems", Proc of the Sixth Intl. Workshop in Hardware/Software Codesign, pp. 105–109 (1998).

"Compiling Java™ Code For Embedded Systems: The FastJ™ Solution", *Diab Data, Inc.,* pp. 1–22 (1998).

"JOVE™ Super Optimizing Deployment Environment™ for Java™", *JOVE Technical Report,* pp. 1–21 (1998).

Per Bothner, "A Gcc–based Java Implementation," Proceedings of IEEE Compcon '97, Feb. 23–26, 1997, pp. 174–178.

Cierniak et al, "Briki: an optimizing Java compiler," Proceedings of IEEE Compcon '97, Feb. 23–26, 1997, pp. 179–184.

Per Bothner, "Compiling Java for Embedded Systems," Paper was presented at the Embedded System Conference West, San Jose, Sep. 1997, 16 pages

Per Bothner, "Writing native Java methods in natural C++: Java/C++ integration," [online], Cygnus Solutions Co., Nov. 1997[retrieved on 1999–09–15]. Retrieved from the Internet: <URL:http://sourceware.cygnus.com/java/papers/native++.html>.

*Primary Examiner*—Tariq R. Hafiz
*Assistant Examiner*—Tuan Q. Dam
*Attorney, Agent, or Firm*—Burns Doane Swecker & Mathis L.L.P.

[57] ABSTRACT

The present invention, generally speaking, provides a machine-independent solution suitable for high-performance systems development. In a preferred embodiment, the solution is Java-based, providing machine independence. The requirements of high-performance systems are satisfied by providing a Java optimizing, ahead-of-time compiler. Optimized ahead-of-time compilation produces code having comparable size and speed as code written in C/C++. At the same time, compatibility with the Java world is afforded, allowing for the mixing and matching of code according to individual system requirements. If the system has a network connection, for example, then the system software may include, in addition to the pre-compiled Java code, a Java Virtual Machine, allowing Java bytecode to be downloaded and run. A coherent model allows for pre-compiled Java code, VM interpreted bytecode and JIT compiled Java code, as well as C/C++code, to interoperate. Preferably, the optimizing ahead-of-time Java compiler is capable of compiling either Java source code or Java bytecode. In this manner, code distributed only in bytecode form may be pre-compiled. A Java stack slot compilation scheme achieves code optimization and overcomes difficulties peculiar to ahead-of-time compilation of Java. In addition, a static layout of Java metadata is created by the compiler, obviating the need to create such a layout at runtime.

13 Claims, 9 Drawing Sheets

FIG._8A  AFTER iconst 5

FIG._8B  AFTER iload #1

FIG._8C  AFTER iadd

FIG._8D  AFTER istore #1

```
tree arg1 = pop_value (int_type_node);
tree arg2 = pop_value (int_type_node);
push_value (fold (build (PLUS_EXPR, int_type_node,
                         arg1, arg2)));
```

FIG._9

```
/*** A SIMPLE CLASS CLASS ***/

/* A linked list of integer values. */
public class IntList extends Sequence
{
  public int value;
  public IntList next;

/* Calculate the sum of the values in an InList. */
  public static int sum(IntList list)
  {
     if (list == null) return 0;
     else return list.value + sum(list.next);
  }
}
```

FIG._10

```
/*** TRANSLATION (expressed as equivelent C code) ***/

/* Code (for method IntList.sum): */ int IntList_sum(IntList *list)
{
  if (list == null) return 0;
  else return list->value + sum(list->next);
}

/* Meta-data for class IntList: */
/* SEE FIG. 4, 430 */
struct Field IntList_fields[2] =
{
  { /* description of field #0 */
    /* name: */         "value",
    /* type: */         INT_TYPE,
    /* offset: */       4 /* bytes */
  },
  { /* description of field #1 */
    /* name: */         "next",
    /* type: */         &IntList_class,
    /* offset: */       8 /* bytes */
  }
};

struct Method IntList_methods[1] =
{
  { /* description of method #0 */
    /* name: */         "sum",
    /* code: */         (Code*) &IntList_sum,
    /* access: */       PUBLIC|STATIC,
    /* etc */           ...
  }
};
/* SEE FIG. 4, 440 */
struct Class IntList_class =
{
  /* name: */           "IntList",
  /* super: */          &Sequence_class,
  /* num_methods: */    1,
  /* methods: */        IntList_methods,
  /* num_fields: */     2,
  /* fields: */         IntList_fields,
  /* size: */           12 /* bytes */
  /* etc */             ...
};
```

*FIG._11*

JAVA DEVELOPMENT ENVIRONMENT USING OPTIMIZING AHEAD-OF-TIME COMPILER

BACKGROUND OF THE INVENTION

1. Field of the Invention

The present invention relates to software development tools, particularly compilers, and to the Java programming language.

2. State of the Art

An embedded system is a specialized computer system that is part of a larger system or machine. Typically, an embedded system is housed on a single microprocessor board with the programs stored in ROM. Virtually all appliances that have a digital interface—watches, microwaves, VCRs, cars—utilize embedded systems. Some embedded systems include an operating system, but many are so specialized that the entire logic can be implemented as a single program.

Although software development for general-purpose computers and software development for embedded systems have much in common, software development for embedded systems is driven by substantially different needs and considerations. In particular, software for embedded systems is typically required to be as fast and compact as possible. Small code size reduces device cost and may contribute also to speed of execution.

A significant impediment to embedded systems development has been the vast variety of embedded system platforms. Unlike the general-purpose computer arena in which a few processors command most of the market, in the embedded systems arena, hundreds of different processors compete for market share. Porting embedded systems software from one processor to another has therefore been required in order to achieve software reuse. Such porting can only be performed by skilled programmers and is laborious, time-consuming, and error-prone.

For general-purpose computers, the Java programming language has emerged, holding the promise of "write-once, run anywhere," a promise which has been at least partly realized. To achieve the same progress in the embedded systems arena would represent a significant advance. However, several obstacles prevent the ready application of Java to embedded systems.

Figure 1:
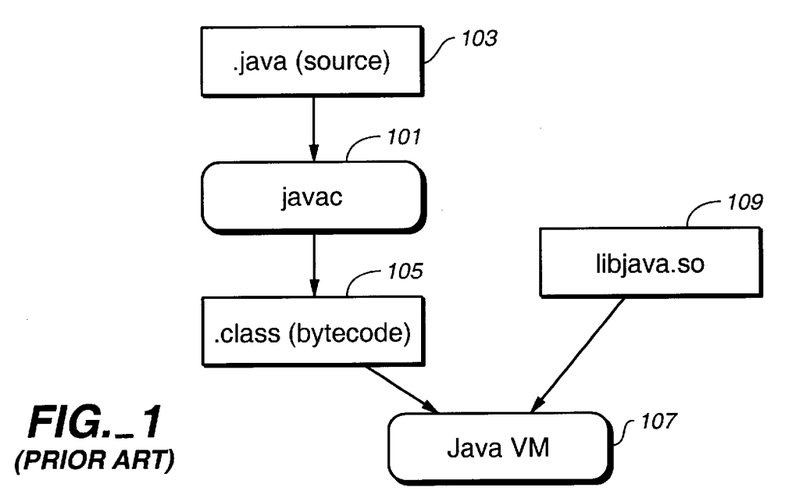
FIG. 1 is a flow diagram of a conventional Java implementation model.

Referring to FIG. 1, the traditional Java implementation model is to use a Java compiler 101 (e.g, javac) to compile Java source code 103 into .class files 105 containing machine-independent byte-code instructions. These .class files are downloaded and interpreted by a browser or some other Java "Virtual Machine" 107 (VM). System services may be offered in the form of class libraries, or .so files 109.

The Java VM is conceptually a stack machine. The instructions interpreted by the VM manipulate data stored within "stack slots." At any given instant, the data within a stack slot may be of any of a number of data types defined in the Java language specification. A Java verifier ensures that type constraints are not violated, e.g., that a stack slot containing an integer is not added to a stack slot containing a string.

Figure 2:
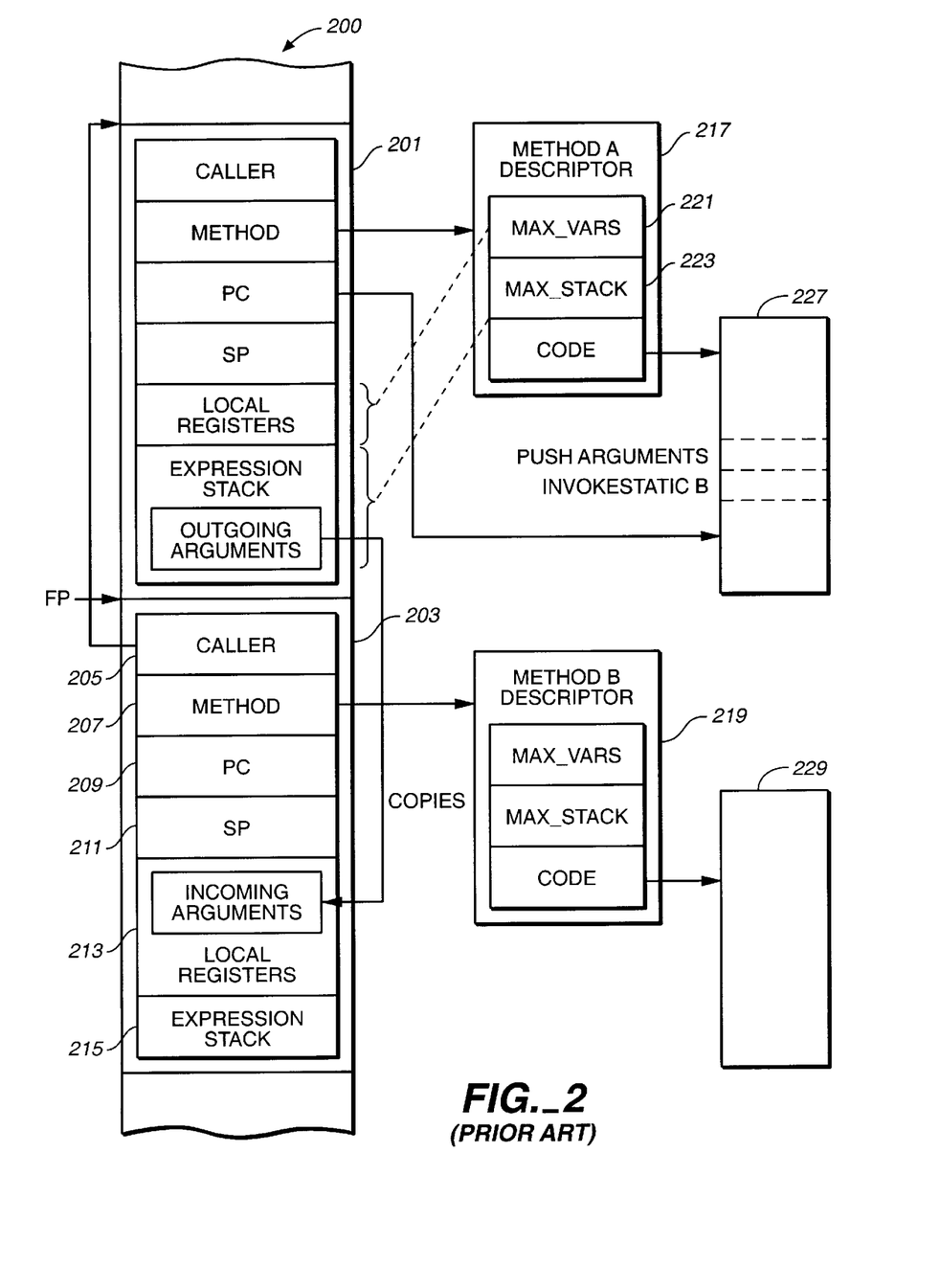
FIG. 2 is a diagram illustrating the run-time model of the Java VM.

A run-time model of the Java VM is shown in FIG. 2. When a method is called, a frame is pushed onto a frame stack 200. In FIG. 2, two frames are shown, a first frame 201 corresponding to a first Method A and a second frame 203 corresponding to a second Method B. A frame pointer FP points to the current frame. A frame includes, for example, a pointer 205 to the frame of the caller, a pointer 207 to a method descriptor corresponding to the called method, a program counter (PC) 209, a stack pointer (SP) 211, a local registers area 213, and an expression stack 215. Each method has a corresponding method descriptor, shown in FIG. 2 as method descriptors 217 and 219, respectively. The size of the local registers area and the expression stack within a frame are determined by parameters max_vars (221) and max_stack (223), respectively, within the corresponding method descriptor. The method descriptor also contains a pointer 225 to the method code. Assume, for example, that Method A calls Method B. Within the code 227 of Method A, there will be instructions to push arguments onto the expression stack for use by Method B. These arguments are outgoing arguments from the standpoint of Method A. After the arguments have been pushed, the following code instructions will invoke Method B, which causes a frame for Method B to be pushed onto the frame stack, outgoing arguments from Method A to be copied as incoming arguments to the first part of the local registers area of the frame of Method B, and finally code 229 of Method B to be executed.

Figure 3:
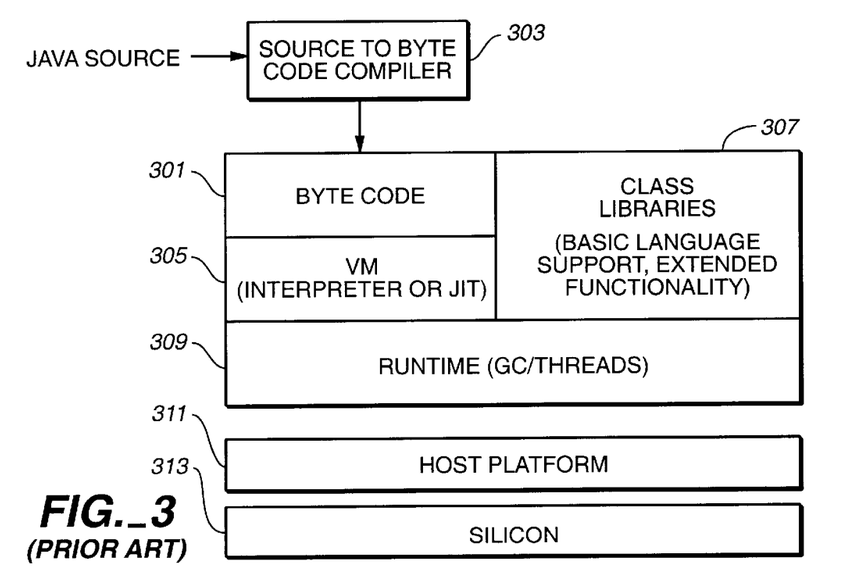
FIG. 3 is a block diagram corresponding to the flow diagram of FIG. 1.

FIG. 3 represents the functional relationships between various entities of a machine running Java in accordance with the traditional model. Byte code 301, obtained using a source to byte code compiler 303, runs on top of a Java VM 305. The Java VM may take the form of an interpreter or a "Just-in-Time" (JIT) compiler. Class libraries 307 provide services to the Java VM and to the byte code program(s), in particular basic language support and extended functionality. A run-time library 309 provides low-level garbage collection (GC) and threads support and runs directly on top of the host platform operation system 311, which in turn runs on the machine hardware, or silicon 313.

The foregoing Java technology model enjoys considerable support. However, interpreting bytecodes make Java programs many times slower than comparable C or C++programs. One approach to improving this situation is JIT compilers. These dynamically translate bytecodes to machine code just before a method is first executed. This can provided substantial speed-up, but it is still slower than C or C++. There are three main drawbacks with the JIT approach compared to conventional compilers. First, the compilation must be re-done every time the application is loaded, which means start-up times are much worse than pre-compiled code. Second, since the JIT compiler has to run fast (it is run every time the application is run), it cannot do any non-trivial optimization. Only simple register allocation and "peep-optimizations" are practical. The need for quick re-compilation will make it very difficult to make JIT faster in practice. Third, the JIT compiler must remain in virtual memory while the application is executing. This memory may be quite costly in an embedded application.

Figure 4:
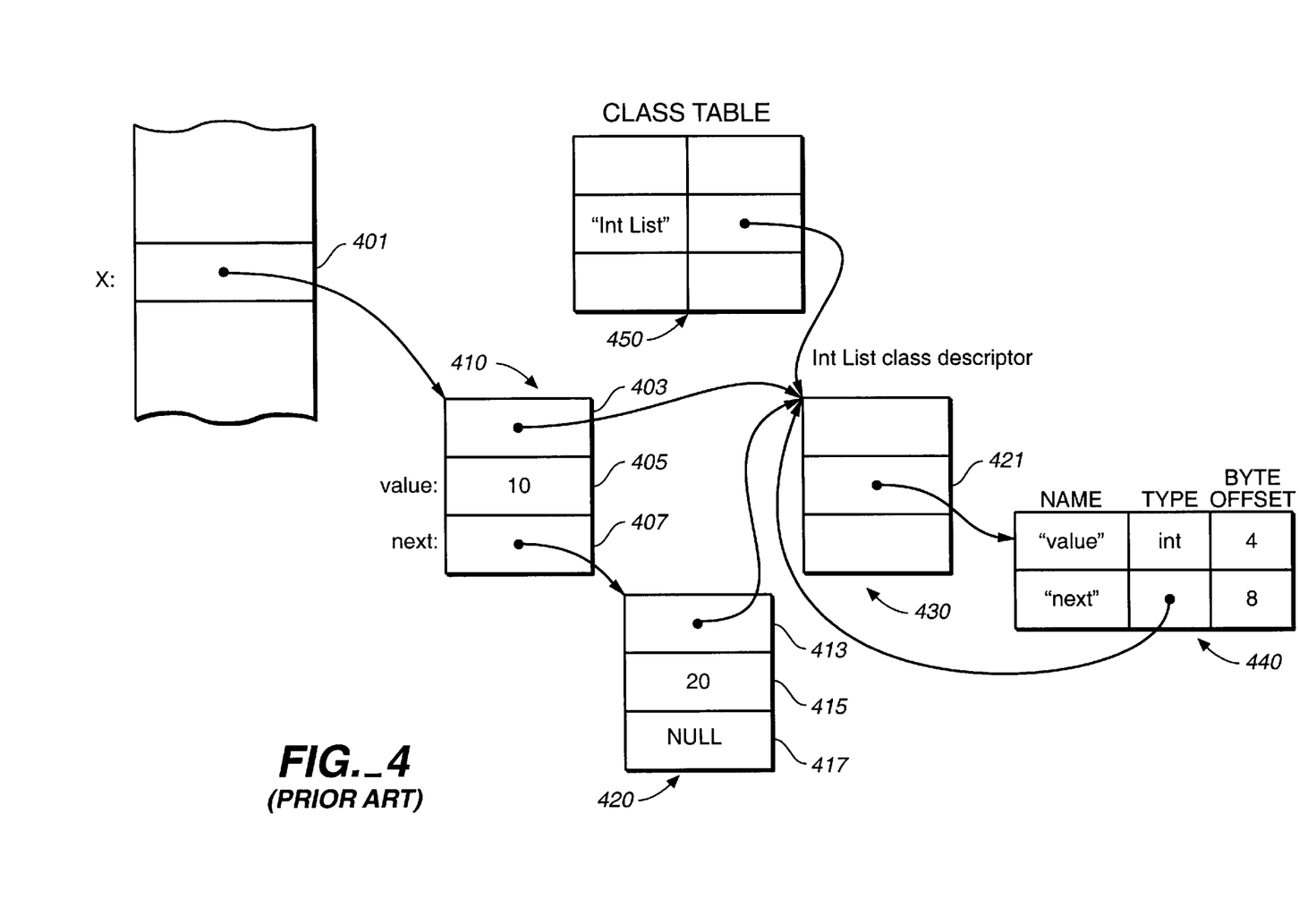
FIG. 4 is a diagram of a data structure containing metadata in accordance with the Java implementation model of FIG. 1.

Also during JIT compilation, before code is executed, considerable time may be spent initializing structures and tables. A Java class file includes substantial "metadata" describing the class. This metadata cannot be efficiently accessed from the class file itself. Instead, the Java run-time environment must read the metadata and from that metadata build an extensive data structure that describes each class with its fields and methods. For example, referring to FIG. 4, assume a class "IntList" that implements a linked list. (The source code in FIG. 10, described hereinafter, assumes the same example class.) In memory, an object reference (pointer) 401 points to a first list object 410 having a pointer 403 to a list class descriptor 430, a value field 405 (containing the value 10), and a pointer 407 to a next list object 420. The next list object 420 also points to the list class descriptor 430 and contains a value 415 (20). The pointer 417 to the next list object is null. The list class descriptor 430 contains pointers to other objects, for example a pointer 421 to an object 440 describing the fields of a list object. The object 440 contains the names, types and byte offsets of the fields "value" and "next." In addition, a Class Table 450 lists the various loaded class and points to their class descriptors. Building the foregoing data structure increases memory requirements and prolongs start-up time.

A degree of machine independence is already achieved by an embedded systems development environment of the present assignee based on the GNU C compiler (gcc). In this development environment, machine-specific compiler "back-ends" for more than 100 embedded systems processors interface to a common gcc compiler "front-end," enabling code written in C/C++to be compiled for any of the supported processors. For write-once run anywhere to span both general-purpose computers and embedded systems, however, and for embedded systems to become Web-enabled, a Java-based embedded-systems development solution is required.

SUMMARY OF THE INVENTION

The present invention, generally speaking, provides a machine-independent solution suitable for high-performance systems development. In a preferred embodiment, the solution is Java-based, providing machine independence. The requirements of high-performance systems are satisfied by providing a Java optimizing, ahead-of-time compiler. Optimized ahead-of-time compilation produces code having comparable size and speed as code written in C/C++. At the same time, compatibility with the Java world is afforded, allowing for the mixing and matching of code according to individual system requirements. If the system has a network connection, for example, then the system software may include, in addition to the pre-compiled Java code, a Java Virtual Machine, allowing Java bytecode to be downloaded and run. A coherent model allows for pre-compiled Java code, VM interpreted bytecode and JIT compiled Java code, as well as C/C++code, to interoperate. Preferably, the optimizing ahead-of-time Java compiler is capable of compiling either Java source code or Java bytecode. In this manner, code distributed only in bytecode form may be pre-compiled. A Java stack slot compilation scheme achieves code optimization and overcomes difficulties peculiar to ahead-of-time compilation of Java. In addition, a static layout of Java metadata is created by the compiler, obviating the need to create such a layout at runtime.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 5:
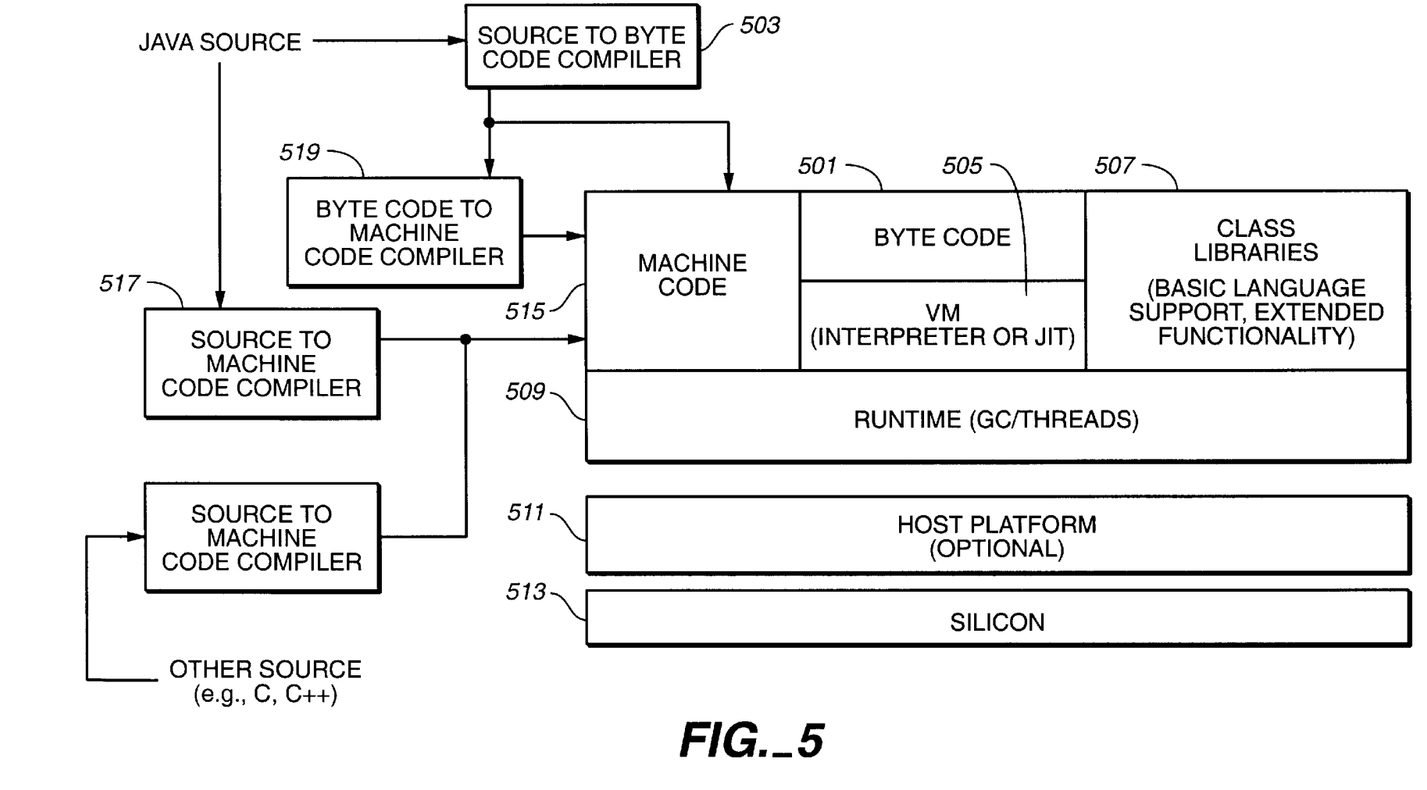
FIG. 5 is a block diagram of a Java implementation model in accordance with one aspect of the present invention.

Referring to FIG. 5, an embedded Java technology model in accordance with one aspect of the present invention is shown. In this model, machine code 515 is provided that, like the class libraries 507, is capable of interoperating with byte code 501 and the Java VM 505. The machine code may be obtained through three different paths. The first path involves compiling Java source code directly using a source to machine code compiler 517. The second path involves compiling byte code using a byte code to machine code compiler 519. The third path involves comopiling some other language (such as C or C++) to machine code, using a suitable compiler 520 such as gcc.

Depending on the particular embedded system, byte code, the Java VM and the host platform operating system may or may not be present.

Figure 6:
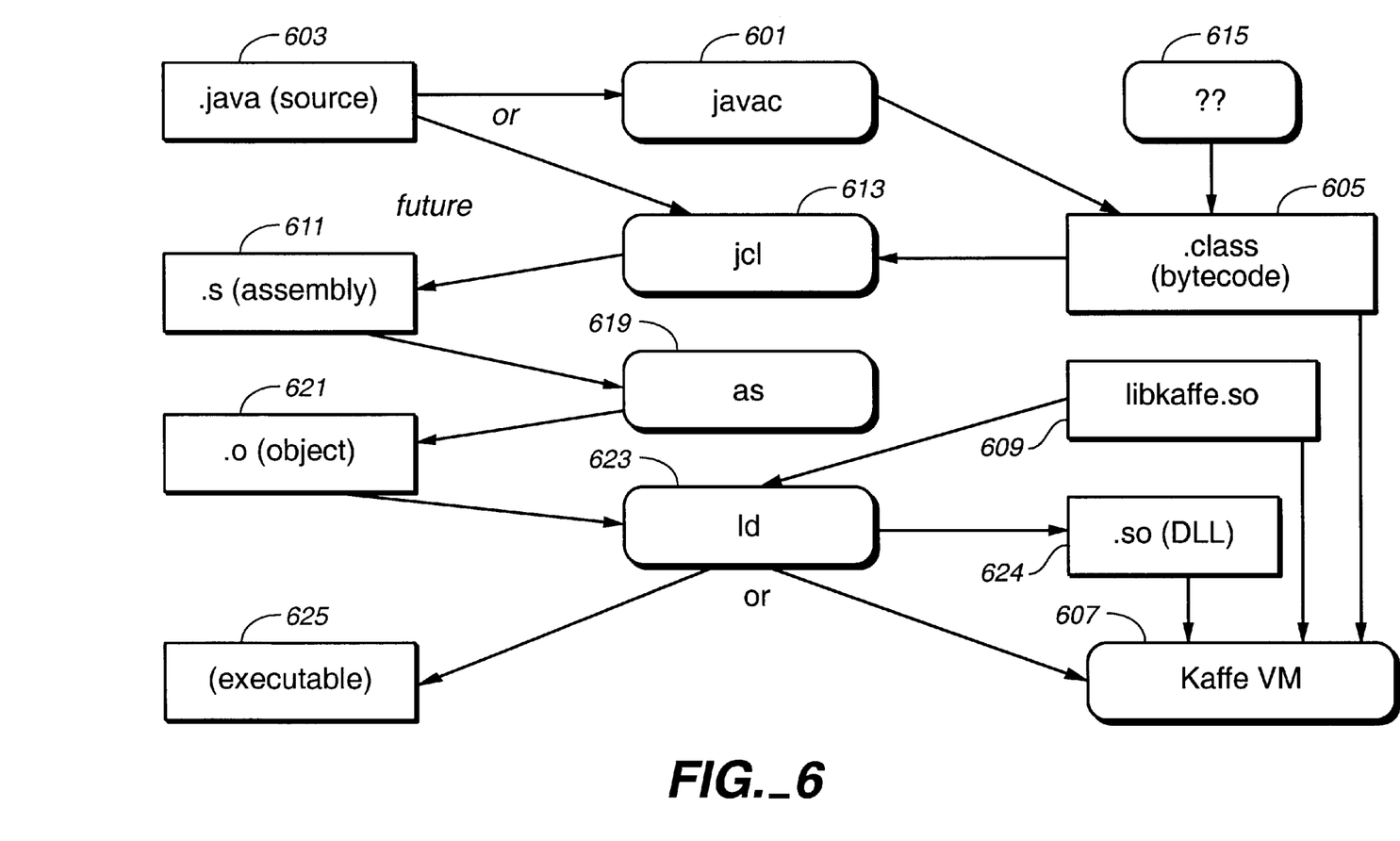
FIG. 6 is a flow diagram corresponding to the flow diagram of FIG. 5.

Referring to FIG. 6, an alternative representation of the embedded Java technology model is shown. Java source code 603 (java) is compiled either to byte code 605 using a suitable compiler 601 such as javac or to assembly code 611 (.s) using a suitable compiler 613 such as jc1 (part of an "egcs", or experimental Gnu Compiler Suite, software release made widely available over the Internet by the present assignee.) Bytecode may also be compiled into assembly code using jc1. The bytecode may be derived from Java source code or may be derived from a different source 615, e.g., Scheme. See, for example, Per Bothner, *Kawa, the Java-based Scheme System*, http://www.cygnus.com/~bothner/kawa.html. The resulting assembly code is in turn assembled (using assembler as, 619) into object code 521 (.o). Object code may be loaded into memory by a loader Id (523) as either an executable 625 or a shared ("Dynamic Link") library 627 (a "DLL").

Assuming a Java VM is present, it operates to run bytecode, class library code, native method code, or any combination of the foregoing. In an exemplary embodiment, the Java VM 607 is Kaffe, a free Java VM available from http://www.kaffe.org/. The associated class library 609 is libkaffe.so.

In the model of FIG. 6, compiled code and bytecode should be able to interoperate if needed. Achieving such interoperability is one important aspect of the present invention. Interoperability is achieved by using compatible structures, tables and calling conventions. In the prior art model of FIG. 3, interoperability between C/C++code and Java byte code is achieved using the Java Native Interface (JNI), which specifies an Application Binary Interface (ABI) which may be used for inter-language communication. However, JNI, although standardized and portable, is comparatively slow and inefficient. This inefficiency is avoided, in accordance with one aspect of the invention, by compiling to a low-level, VM-specific ABI. In an exemplary embodiment, the ABI chosen is that of Kaffe, although an alternative ABI could be chosen instead. Kaffe uses a JIT compiler on many common platforms. Using a JIT compiler makes it easy to call between pre-compiled and dynamically loaded methods, since both use the same calling convention.

In the standard Java model, in addition to space needed for the user code, there is also a substantial body of fixed code for the Java VM and run-time environment. This code includes, for example, standard libraries, code for loading new classes, a garbage collector, and the JIT compiler. Some applications may need access to dynamically loaded classes, the Java Native Interface (JNI), reflection, and a large class library. Other applications may need none of these. Hence, in a memory-tight environment, it may be desirable to leave out some of this support code. For example, if there is no need for loading new classes at run-time, the code for reading class files and interpreting (or JIT-compiling) bytecodes may be omitted. Similarly, different clients may also want different algorithms for garbage collection or different thread implementations. Preferably, a configuration utility is provided to allow the features needed in a Java VM to be selected, in much the same fashion as configuring kernal options before building an operating system.

Code efficiency is of paramount concern in embedded systems. Also an important consideration is minimizing startup time. Other aspects of the present invention maximize code efficiency and minimize startup time.

Figure 7:
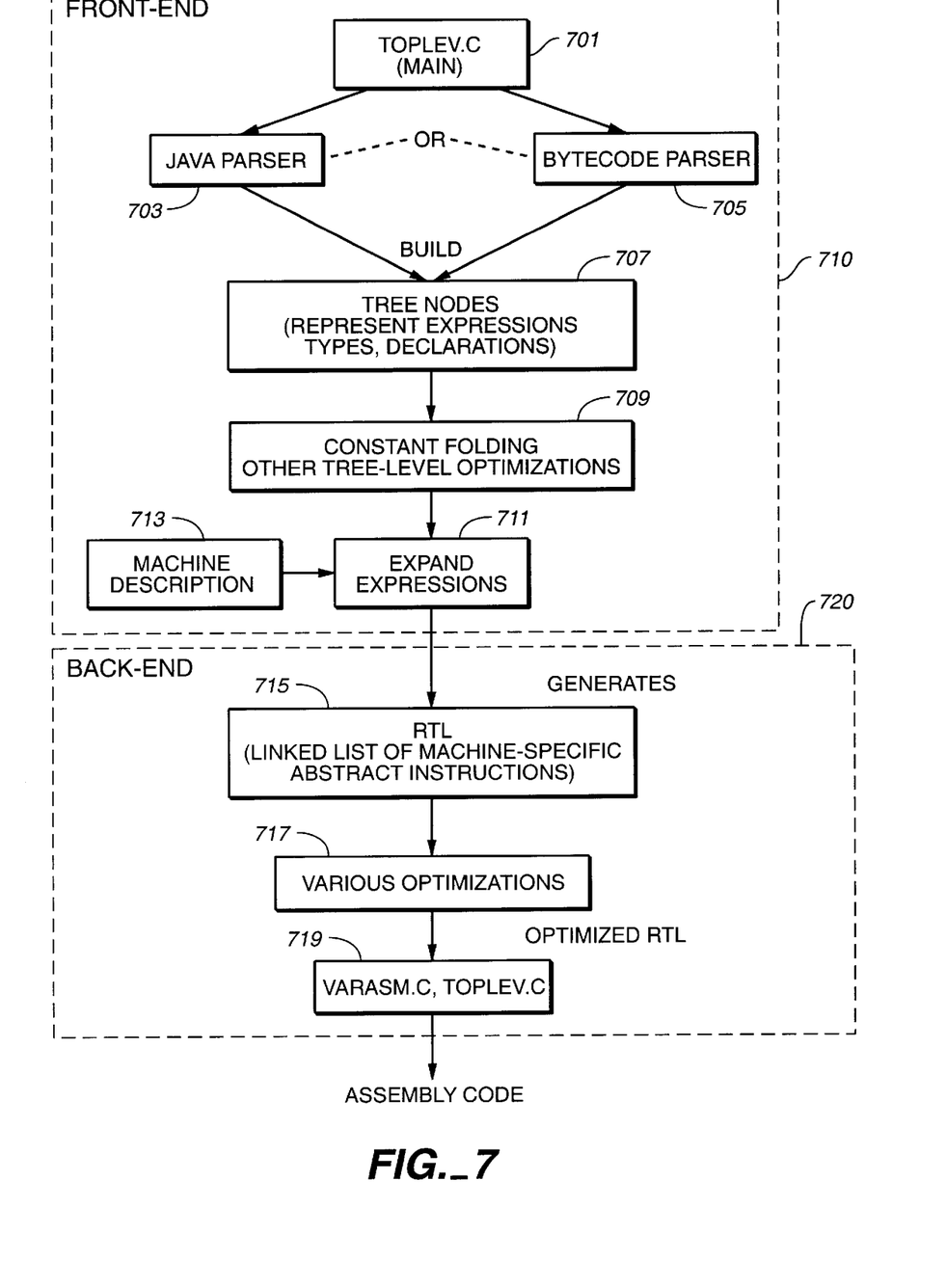
FIG. 7 is a block diagram of an optimizing ahead-of-time Java compiler in accordance with one aspect of the present invention.

Referring to FIG. 7, a block diagram is shown of an optimizing ahead-of-time Java compiler in accordance with one aspect of the present invention. Internally, gcc uses two main representations. The first is a tree representation, at a level corresponding to well-known abstract syntax trees, used to represent high-level, fully-typed expressions, declarations, and types. The second is an RTL (Register Transfer Language) form used to represent instructions, instructions patterns, and machine-level calculations in general. Constant folding is done using trees, but most other optimizations are done at the RTL level. In FIG. 7, a compiler shell 701 (TOPLEV.C) determines whether Java source code or Java bytecode is to be compiled, and invokes the corresponding one of a Java parser 703 and a bytecode parser 705. The parser that is invoked builds a tree node representation 707 of expressions, types, declarations, etc. Constant folding is then performed (709) in a manner well-known in the art. A module EXPAND_EXPR 711, using a machine description 713, then expands the tree node expressions to generate a Register Transfer Language (RTL) representation 715, a linked list of machine-specific abstract instructions. The code modules that perform the foregoing operations are generally referred to as the compiler front-end (710).

In the compiler back-end (720), various optimizations (717) are performed on the RTL representation 715 to produce optimized RTL. From the optimized RTL, modules VARASM.C and TOPLEV.C (719) produce assembly code for the target machine.

Stack slot compilation is the process, defined in accordance with the present invention, of mapping instructions whose target is the stack machine constituting the Java VM to register-specific instructions whose target is a real processor. Within the compiler, this mapping is a two step process. First, stack slots are mapped to virtual registers, i.e., representations of registers within the compiler. Second, these virtual registers are mapped to physical registers or to memory locations in a function call frame. The mapping must observe type constraints imposed by the compiler and should also produce efficient, optimized code. A simple one-to-one mapping between stack slots and virtual registers does neither. Consider the example shown in Table 1, in which a register value ("Register 1") is incremented by a constant value (5). In the example, vreg 11, vreg50 and vreg51 are virtual

TABLE 1

| Java | Bytecode | Simple Translation |
|---|---|---|
| x = 5 + x | iconst 5 | vreg50 = 5 |
| | iload #1 | vreg51 = vreg11 |
| | iadd | vreg50 = vreg50 + vreg 11 |
| | istore #1 | vreg11 = vreg50 | registers within the compiler. The simple mapping shown does not take advantage of possible optimizations. An optimizer may be run subsequently during a separate pass. Such an approach, however, is inconvenient and time-consuming. Furthermore, such an approach may violate the type constraints of the compiler.

The type constraints of the compiler are satisfied, in accordance with one aspect of the invention, by mapping a stack slot not to a single virtual register but to a "family" of virtual registers, one for each machine mode. An exemplary mapping is shown in Table 2. Using an internal structure having an organization like that of Table 2, the compiler models the run-time environment of the Java VM. Table 2 is a "sparse" table, "filled out" by the compiler only as need. When optimizations are subsequently performed with respect to the virtual registers, the optimization is guaranteed to produce the correct result.

TABLE 2

| | | JVM Stack Slots | | | JVM Local Registers (Incoming Arguments and Local Variables) | | |
|---|---|---|---|---|---|---|---|
| Machine Mode | Used for Java Type | 0 | 1 | ... max_vars-1 | 0 | 1 | ... max_stack-1 |
| SI (Single Integer) | int, short, boolean, byte, char | vreg50 | vreg51 | | | vreg11 | |
| DI (Double Integer) | long | | | | | | |

TABLE 2-continued

| Machine Mode | Used for Java Type | JVM Stack Slots | | | | JVM Local Registers (Incoming Arguments and Local Variables) | | | |
|---|---|---|---|---|---|---|---|---|---|
| | | 0 | 1 | ... | max_vars-1 | 0 | 1 | ... | max_stack-1 |
| SF (Single Float) | float | | | | | | | | |
| DF (Double Float) | double | | | | | | | | |
| P (Pointer) | all object references | | | | | vreg10 | | | |

Figure 8A:
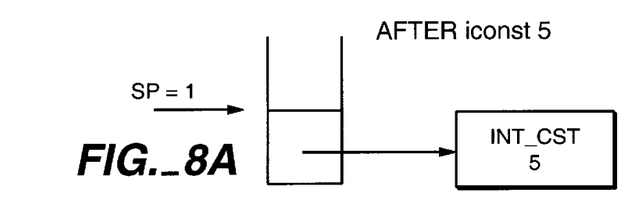
FIG. 8A is part of an example of how the Java VM stack is modeled by a stack of tree nodes, showing a first "snap-shot" of the stack.
Figure 8B:
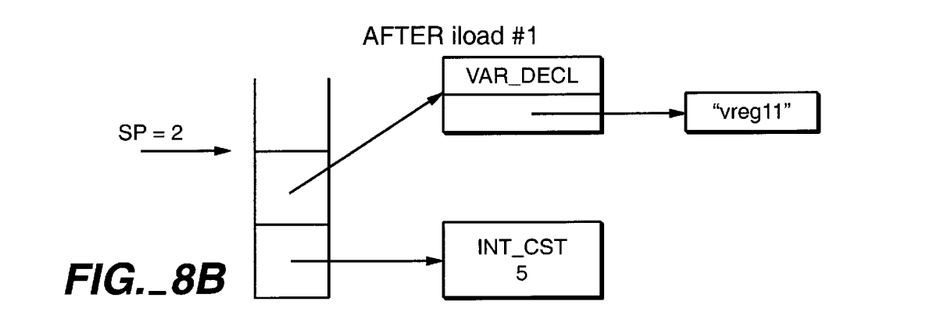
FIG. 8B is part of an example of how the Java VM stack is modeled by a stack of tree nodes, showing a second snap-shot of the stack.
Figure 8C:
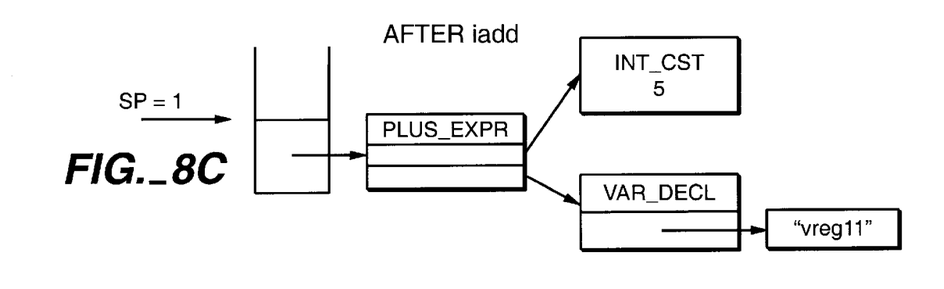
FIG. 8C is part of an example of how the Java VM stack is modeled by a stack of tree nodes, showing a third snap-shot of the stack.

Code efficiency is achieved by modeling the Java stack as a stack of tree nodes. In the gcc compiler, tree nodes are similar to abstract syntax trees, well-known in the area of compilers. In the case of the s of instructions in Table 1, the present optimizing ahead-of-time Java compiler creates a tree node representation. First, as shown in FIG. 8A, a node is created representing the integer constant 5. The stack pointer is set to 1. Next, a node is created representing the variable X, assumed to have been mapped to vreg11 (FIG. 8B). The stack pointer is incremented to 2. Next, a node is created representing the addition. The node points to the two nodes created previously and "consumes" them such that, although three nodes have been created, the stack pointer becomes 1 (FIG. 8C).

Figure 8D:
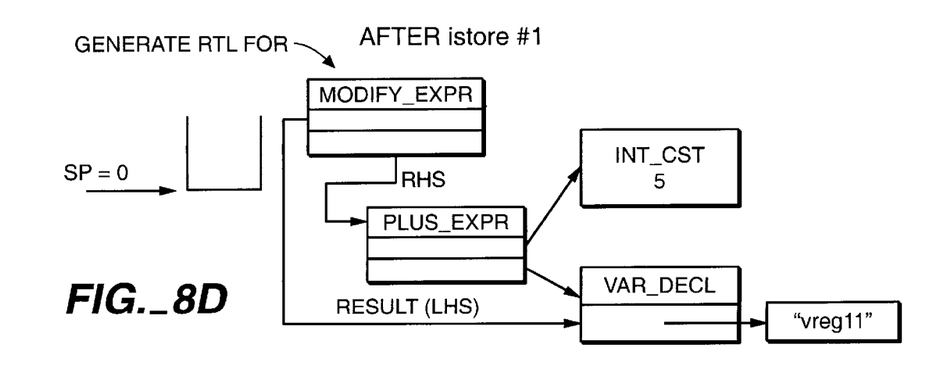
FIG. 8D is part of an example of how the Java VM stack is modeled by a stack of tree nodes, showing a fourth snap-shot of the stack.

When a branch condition or "side condition" is encountered, the stack must be "flushed." The istore instruction is one such side condition. In FIG. 8D, therefore, a MODIFY_EXPR node has been created, with pointers nodes representing the left-hand side (LHS) of the expression and the right-hand side (RHS) of the expression. The tree node structure is passed to EXPAND_EXPR (711), which generates machine-specific RTL representing the machine instructions.

Figure 9:
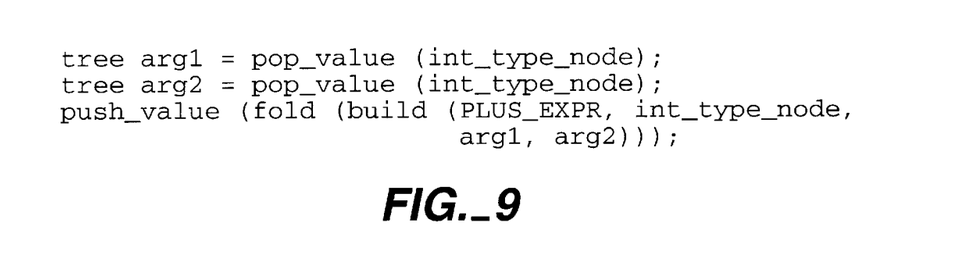
FIG. 9 is a fragment from the jc1compiler showing how it simiulates the Java VM stack of tree nodes.

A fragment from the jc1 compiler, showing how it implements the iadd instruction in general, is shown in FIG. 9. The build function is a standard gcc function for creating tree nodes, and fold is a standard function for doing constant folding. The functions pop_value and push_value keep track of which stack location corresponds to which tree node. From this tree node representation of the gcc compiler front-end, the gcc compiler back-end subsequently generates actual code.

Since virtual registers are allocated only as needed, fewer virtual registers are used, resulting in better code. The benefit is also obtained of constant folding and of existing machinery for selecting the right instructions for addition and other expressions. The result is that code is generated using substantially the same mechanisms used by the gcc C and C++front ends. Similar code quality may therefore be expected.

The prior art process of building a complex data structure containing class metadata has been described. In accordance with one aspect of the invention, this building process is avoided by having the compiler directly create the internal representation required by the run-time environment. The compiler statically allocates and initializes the internal data structures, such that very little initialization remains to be performed at run time.

Figure 10:
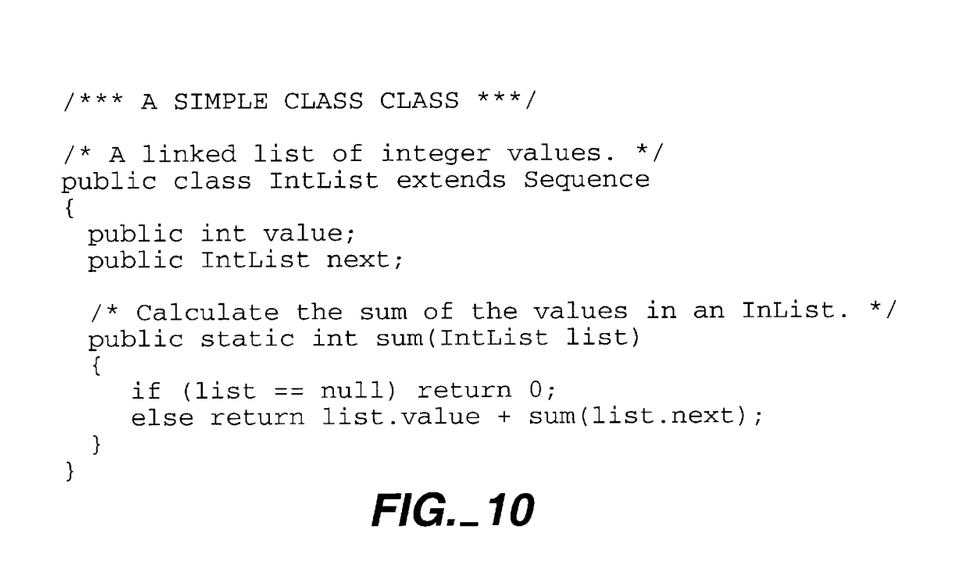
FIG. 10 is an example of a Java class.

Referring to FIG. 10, source code for an example Java class is shown. In the standard Java implementation model, a class file is created from source code. Included in the class file is metadata obtained from a class declaration (not shown). However, the class file metadata is not suitable for the VM. Instead, when the VM loads the class, it reads the metadata and dynamically generates a data structure as in FIG. 4.

Figure 11:
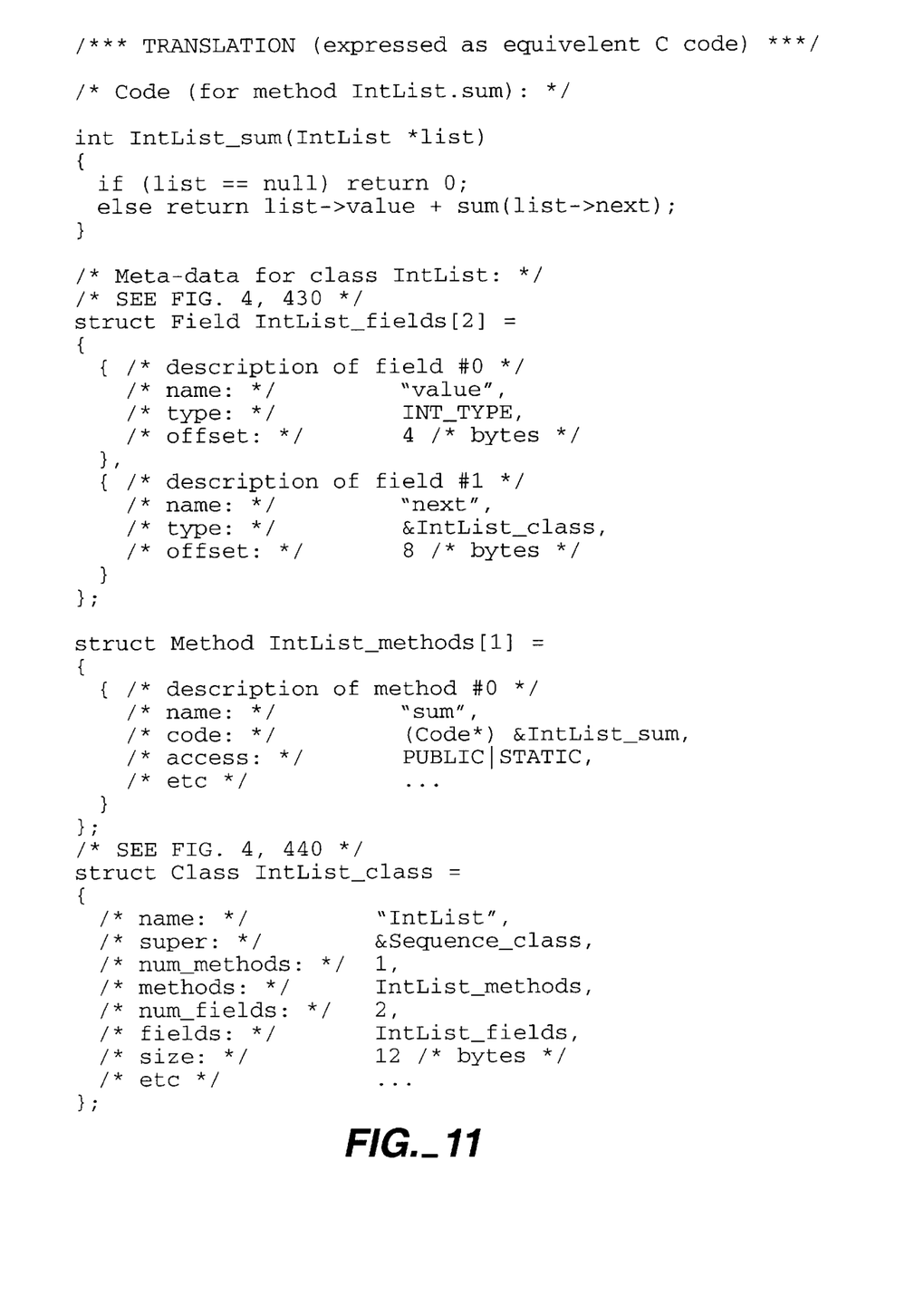
FIG. 11 is an example of the Java class of FIG. 10 with associated precompiled metadata.

In accordance with one aspect of the present invention, metadata is stored as static initialized data. A source code representation of the form of the compiled class is shown in FIG. 11. The metadata stored as static initialized data may be used directly. The process of building a data structure such as that of FIG. 4 may therefore be avoided. As a result, startup is fast and does not require any dynamic allocation.

It will be appreciated by those of ordinary skill in the art that the invention can be embodied in other specific forms without departing from the spirit or essential character thereof. For example, although the described development environment is especially suitable for embedded systems development, it is of general applicability and is not limited to embedded systems. An optimizing ahead-of-time Java compiler may be included with installation software such that byte code distributions may be compiled at installation time to produce efficient machine code.

The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of producing software code, comprising the steps of:

producing code in a first high-level programming language having both a source code and an intermediate form in which code is represented in terms of machine-independent code instructions, wherein a standard execution model of said high-level programming language is to interpret or compile at run time said machine-independent code instructions;

producing code in a second different high-level programming language; and pre-compiling code in said first language and code in said second language for a specific machine using an optimizing ahead-of-time compiler, producing pre-compiled code;

wherein code in said first language and code in said second language is compiled using shared data type representations and calling conventions, achieving efficient direct interoperability.

2. The method of claim 1, wherein said first code is pre-compiled from source code.

3. The method of claim 1, wherein said first code is precompiled from said machine-independent code instructions.

4. The method of claim 1, comprising the further steps of:

selecting a subset of run-time components called for by said standard execution model; and fixing only said subset of run-time components within a system.

5. The method of claim 4, comprising the further steps of:

including within said system, software realizing a virtual machine for executing said machine-independent code instructions, and communications software for downloading a file of said machine-independent code instructions.

6. The method of claim 5, comprising the further step of downloading a file of said machine-independent code instructions.

7. The method of claim 6, comprising the further step of executing said machine-independent code instructions on said virtual machine.

8. The method of claim 7, comprising the further steps of causing said machine-independent code instructions and said pre-compiled code to interoperate.

9. A method of producing software code, comprising the steps of:

producing code in a high-level programming language having both a source code and an intermediate form in which code is represented in terms of machine-independent code instructions, wherein a standard execution model of said high-level programming language is to interpret or compile at run time said machine-independent code instructions; and pre-compiling said first code for a specific machine using an optimizing ahead-of-time compiler, producing pre-compiled code;

wherein pre-compiling comprises a stack slot compilation process in which a stack slot, representing data of a particular Java type, is mapped to one of a set of virtual registers according to a machine mode used to represent data of said particular Java type.

10. The method of claim 9, wherein stack slot compilation comprises:

modeling a stack of said standard execution model using a stack of tree nodes; and expanding tree node expressions to obtain a machine-instruction-level code representation.

11. The method of claim 10, comprising the further step of performing optimizations on the machine-instruction-level code representation to produce an optimized machine-instruction-level code representation.

12. The method of claim 11, comprising the further step of producing assembly code from the optimized machine-instruction-level code representation.

13. A method of producing software code, comprising the steps of:

producing code in a high-level programming language having both a source code and an intermediate form in which code is represented in terms of machine-independent code instructions, wherein a standard execution model of said high-level programming language is to interpret or compile at run time said machine-independent code instructions; and pre-compiling said first code for a specific machine using an optimizing ahead-of-time compiler, producing pre-compiled code;

wherein said first code contains metadata describing at least one of data fields used by said first code and methods used by said first code, and wherein pre-compiling comprises transforming said metadata to produce an initialized static data representation of said metadata.

* * * * *